(12) United States Patent
Davis

(10) Patent No.: US 10,040,185 B2
(45) Date of Patent: Aug. 7, 2018

(54) SKATE TOOL

(71) Applicant: Reginald S. Davis, Novato, CA (US)

(72) Inventor: Reginald S. Davis, Novato, CA (US)

( * ) Notice: Subject to any disclaimer, the term of this patent is extended or adjusted under 35 U.S.C. 154(b) by 70 days.

(21) Appl. No.: 15/215,828

(22) Filed: Jul. 21, 2016

(65) Prior Publication Data
US 2017/0021487 A1    Jan. 26, 2017

Related U.S. Application Data

(60) Provisional application No. 62/195,379, filed on Jul. 22, 2015.

(51) Int. Cl.
| | |
|---|---|
| *B25F 1/04* | (2006.01) |
| *B25B 15/00* | (2006.01) |
| *B25B 13/46* | (2006.01) |
| *B26B 11/00* | (2006.01) |
| *B23G 5/20* | (2006.01) |
| *A63C 17/00* | (2006.01) |
| *B25B 13/06* | (2006.01) |
| *B25B 13/48* | (2006.01) |
| *B25B 13/56* | (2006.01) |
| *B25B 15/04* | (2006.01) |
| *B25F 1/00* | (2006.01) |

(52) U.S. Cl.
CPC ............ *B25F 1/04* (2013.01); *A63C 17/0006* (2013.01); *B23G 5/20* (2013.01); *B25B 13/06* (2013.01); *B25B 13/48* (2013.01); *B25B 13/56* (2013.01); *B25B 15/04* (2013.01); *B25F 1/00* (2013.01); *B25F 1/003* (2013.01); *B26B 11/00* (2013.01); *B23G 2200/144* (2013.01)

(58) Field of Classification Search
CPC .. B25F 1/00; B25F 1/04; B25F 1/0003; A63C 17/0006; B23G 5/20; B23G 2200/144; B25B 13/06; B25B 13/48; B25B 13/56; B25B 15/04; B26B 11/00
USPC .......................................................... 7/138
See application file for complete search history.

(56) References Cited

U.S. PATENT DOCUMENTS

| | | | |
|---|---|---|---|
| 4,504,993 A * | 3/1985 | Gamble | A43B 5/0415 |
| | | | 280/816 |
| 4,774,736 A | 10/1988 | Brawner et al. | |
| 6,151,997 A * | 11/2000 | Lin | B25G 1/085 |
| | | | 7/127 |
| 6,279,434 B1 | 8/2001 | Brown | |
| 6,295,897 B1 | 10/2001 | Swank et al. | |

(Continued)

*Primary Examiner* — Hadi Shakeri
(74) *Attorney, Agent, or Firm* — Steven A. Nielsen; NielsenPatents.com

(57) ABSTRACT

A skateboard tool system (100) may comprise a first arm (200), a second arm (300), a third arm (400) attached to a body (500) with each arm forming an overall "T" shape and each arm having a distal end attached to a useful implement. To gain mechanical advantage, the body (500) may contain or be integrated with a rethreading tool (540). The centralized location of the re-threading tool in combination with the "T" shape allows for a superior purchase or grip while rotating the re-threading tool. The body may define various voids to comport with a unique "L" shaped screw driver (600), the screw driver having a shorter (605) and a longer (607) longitudinal member giving additional leverage in rotating a Phillip head screw driver (610). A cutting blade is retained within the body for ease of access and safety.

2 Claims, 6 Drawing Sheets

(56) References Cited

U.S. PATENT DOCUMENTS

| | | | |
|---|---|---|---|
| 6,865,760 B2 * | 3/2005 | Oberndorfer | B23D 71/04 7/138 |
| 7,127,766 B1 | 10/2006 | Carter | |
| 7,305,907 B2 | 12/2007 | Burwell | |
| D622,561 S | 8/2010 | Brown | |
| 2003/0089141 A1 * | 5/2003 | Edwards | A63C 11/006 70/18 |
| 2003/0217623 A1 * | 11/2003 | Brown | B25B 13/48 81/437 |
| 2011/0030146 A1 * | 2/2011 | Wu | B25B 13/463 7/138 |

* cited by examiner

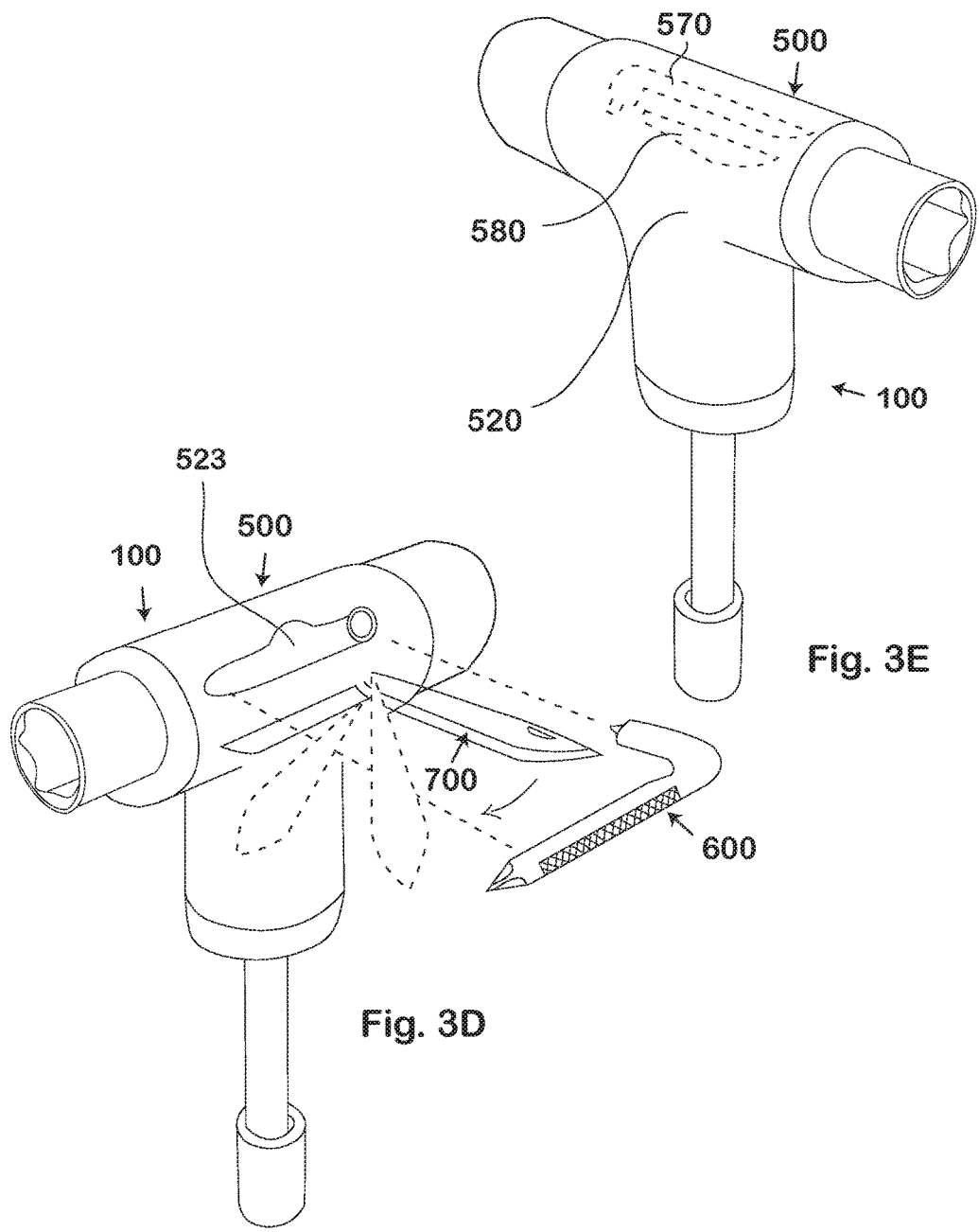

US 10,040,185 B2

SKATE TOOL

CROSS-REFERENCE TO RELATED APPLICATIONS

This is a utility application based upon and claims priority from U.S. patent application Ser. No. 62/195,379 filed on Jul. 22, 2015. This related application is incorporated herein by reference and made a part of this application. If any conflict arises between the disclosure of the invention in this utility application and that in the related provisional application, the disclosure in this utility application shall govern. Moreover, the inventor(s) incorporate herein by reference any and all patents, patent applications, and other documents hard copy or electronic, cited or referred to in this application.

BACKGROUND OF THE INVENTION

(1) Field of the Invention

The invention generally relates to tool systems. More particularly, the invention relates to means and methods of creating a multi-purpose tool useful with skateboards.

(2) Description of the Related Art

While other skate board tools are known, the known related art fails to anticipate or disclose the principles of the present invention.

In the related art, the general idea of a multipurpose skate tool is disclosed in U.S. Pat. No. 7,127,766 granted to Carter on Oct. 31, 2006. The Carter tool discloses a bulky five armed body that is difficult to transport.

U.S. Pat. No. 6,279,434 granted to Brown on Aug. 28, 2001 discloses a tool in the general shape of a "T" and is marginally equipped with rudimentary tool ends. The Brown tool has a "T" shape body having a crossbar bisected by a stem and provides for three sockets of differing sizes, each socket mounted at each end of the crossbar and the free end of the stem. Brown includes a combination Allen key and Phillips head screwdriver and a standard Allen wrench having a long arm and a short arm perpendicular to the long arm. The Brown tool fails to provide tool implements necessary for today's skateboarding enthusiasts.

U.S. Pat. No. D622,561 granted to Brown on Aug. 31, 2010 discloses a "T" shaped tool with a ratcheting arm; however, Brown fails to disclose or suggest the use or storage of a folding blade or multi-purpose screwdriver.

Thus, there is a need in the art for the presently disclosed embodiments.

BRIEF SUMMARY OF THE INVENTION

The present invention overcomes shortfalls in the related art by presenting an unobvious and unique combination and configuration of methods and components to provide a plethora of tools within a compact format. Disclosed embodiments present an unobvious improvements and advantages over the current tools of the related art.

The invention overcomes shortfalls in the related art by providing an efficient form factor and providing a blade or other edge component to cut grip tape, a re-threading tool, a ratchet arm with a ratchet selector switch, a metal file, and "L" shaped screw driver providing enhanced leverage.

Embodiments of the invention may also include the use of a plastic cover in the shape of a "T" to increase applied leverage and tool longevity. Embodiments may be used for assembling, disassembling and repairing skateboards while in a skating environment where traditional tools are not found. Disclosed embodiments may comprise three arms or protrusions, two being short arms and one long arm that bisects the short arms, composing a "T" shape.

A face of the tool may feature a rethreading die is in the center. Below the rethreading die, a socket switch is disposed in order to operate the ratcheting arm, the ratcheting arm being the longest arm of the three. An opposite side may contain a removable "L" shaped screwdriver and a small folding or retracting blade.

A disclosed screwdriver may comprise a long end having a Philips head and a short end having an Allen head. The screwdriver is placed horizontally in the short arm with the Allen head inserted in the fitting. A knife or sharp edge implement is embedded in the same arm just below the screwdriver, resembling a pocket knife.

Disclosed embodiments overcome shortfalls in the art as the disclosed embodiments facilitate all procedures for preparing new skateboards and for repairing well used or "broken in" skateboards. In one disclosed embodiment, a main body includes a ratchet-like arm that assembles skateboards faster. Moreover, a folding knife included and may be used for cutting grip tape. Included screwdriver implements may be used to secure a board with turning axles; as they are held together by the nuts and bolts. A face contains a die for re-threading worn axles.

These and other objects and advantages will be made apparent when considering the following detailed specification when taken in conjunction with the drawings.

BRIEF DESCRIPTION OF THE DRAWINGS

FIG. 3D depicts an isometric view of a disclosed embodiment having a folding blade and screwdriver FIG. 3E depicts an isometric view of a disclosed embodiment with voids sometimes used to store a folding blade and screwdriver

Figure 1:
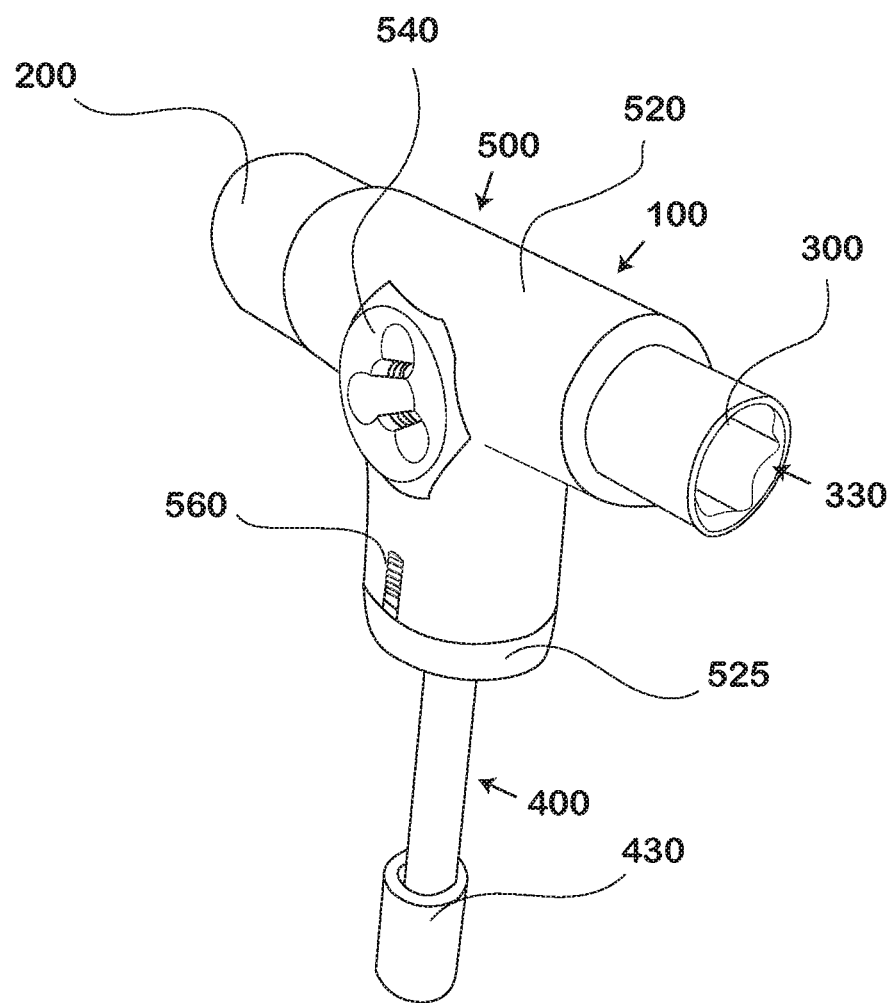
FIG. 1 depicts an isometric view of a disclosed skate tool, showing a die and a T-switch

REFERENCE NUMERALS IN THE DRAWINGS 100 disclosed embodiment in general
200 first arm
230 socket of first arm 200
300 second arm
330 socket of second arm 300
400 a third arm
430 end socket of third arm 400
500 main body
520 plastic cover of main body
523 void within main body 500, sometimes used to retain a screw driver 600
525 endcap of plastic cover 520

540 re-threading tool of main body 500
560 T switch or ratchet selector switch to control rotational force of third arm 400
570 alternative screw driver void defined within main body 500
580 blade void defined within main body 500
600 "L" shaped screw driver
605 shorter longitudinal member of screw driver 600
607 longer longitudinal member of screw driver 600
610 Phillip head of screw driver 600
620 metal file section of screw driver 600
630 Allen head of screw driver 600
700 blade or other edge implement
710 pin void of blade 700 or other means of rotation upon a body 500

DETAILED DESCRIPTION OF EMBODIMENTS OF THE INVENTION

The following detailed description is directed to certain specific embodiments of the invention. However, the invention can be embodied in a multitude of different ways as defined and covered by the claims and their equivalents. In this description, reference is made to the drawings wherein like parts are designated with like numerals throughout.

Unless otherwise noted in this specification or in the claims, all of the terms used in the specification and the claims will have the meanings normally ascribed to these terms by workers in the art.

Unless the context clearly requires otherwise, throughout the description and the claims, the words "comprise," "comprising" and the like are to be construed in an inclusive sense as opposed to an exclusive or exhaustive sense; that is to say, in a sense of "including, but not limited to." Words using the singular or plural number also include the plural or singular number, respectively. Additionally, the words "herein," "above," "below," and words of similar import, when used in this application, shall refer to this application as a whole and not to any particular portions of this application.

The above detailed description of embodiments of the invention is not intended to be exhaustive or to limit the invention to the precise form disclosed above. While specific embodiments of, and examples for, the invention are described above for illustrative purposes, various equivalent modifications are possible within the scope of the invention, as those skilled in the relevant art will recognize. For example, while steps are presented in a given order, alternative embodiments may perform routines having steps in a different order. The teachings of the invention provided herein can be applied to other systems, not only the systems described herein. The various embodiments described herein can be combined to provide further embodiments. These and other changes can be made to the invention in light of the detailed description.

Any and all the above references and U.S. patents and applications are incorporated herein by reference. Aspects of the invention can be modified, if necessary, to employ the systems, functions and concepts of the various patents and applications described above to provide yet further embodiments of the invention.

FIG. 1 an embodiment 100 comprising a first arm 200, a second arm 300 and a third arm 400. The three arms may be joined or be integral to a main body 500, with the main body covered with a cover 520, sometimes made of plastic. The cover 520 may be attached to or integrated with an end cap 525. The body 500 may comprise a re-threading tool 540 and the body may comprise an internal ratchet system (not shown) connected with the third arm 400. The internal ratchet system may be controlled by an external T switch or ratchet selector switch 560 found upon the main body 500. The third arm 400 is shown with an end socket 430 and the second arm 300 is shown with an end socket 330. The end socket 430 of the third arm may be a ⅜ inch socket while the end socket 330 of the second arm may be a ½ inch socket. The first arm 200 may have a socket 230 (shown in FIG. 4) of a size of 9/16 inch.

The T switch or ratchet selector switch 560 may control the rotational force of the rotating third arm 400 and connected socket 430 with the connected socket 430 sometimes used in assembling trucks or turning axles.

The re-threading tool 540, in one embodiment, may be used while disposed to the first arm 200.

A disclosed body 500 may include a ratchet-like arm 400 for assembling skateboards efficiently, decreasing set-up time. A disclosed embodiment may comprise a T switch 560, enabling the tool to rotate clockwise or counter-clockwise. When the grip tape is applied, the screw driver, equipped with a metal file, is used to trace the shape of the board before cutting; the blade will be used to cut the grip tape. The face contains a die for re-threading axles, which prevents stripping the nuts that screw on the axles. Overall, "T" shape enables the user to work resourcefully, providing significant leverage while operating a disclosed embodiment.

Figure 2:
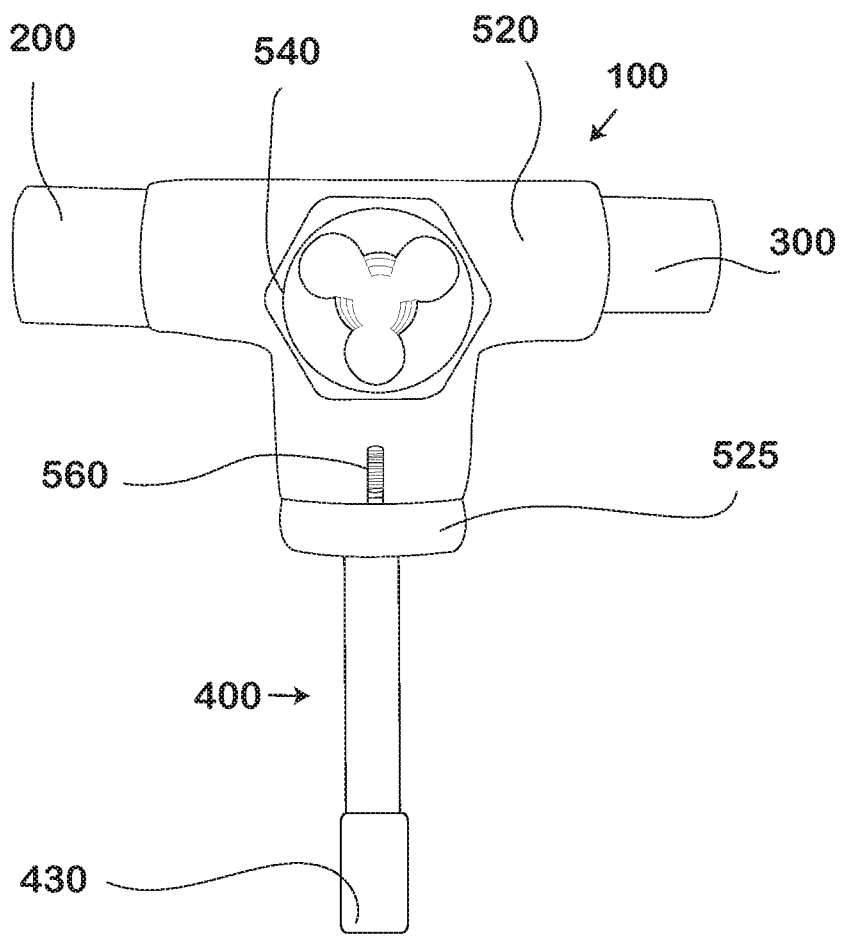
FIG. 2 depicts a front view of a disclosed skate tool

FIG. 2 depicts various features such as the first arm 200, second arm 300 and third arm 400. More particularly, FIG. 2 depicts a cover 520 of the main body, a re-threading tool 540, a T switch 560 or ratchet selector switch, the switch sometimes used to control the rotational force of the third arm 400. The distal end of the third arm 400 may comprise an end socket 430. An endcap 525 may be disposed at the inferior end of the cover 520.

Figures 3A, 3B, 3C:
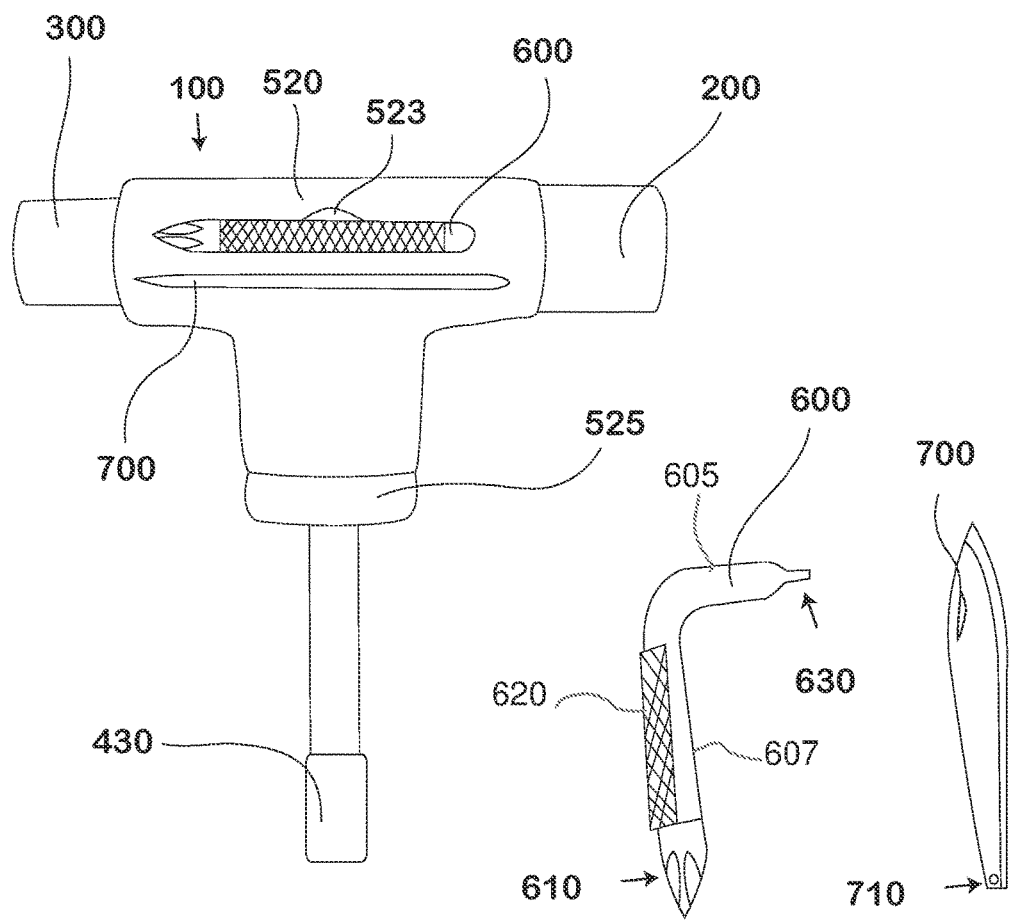
FIG. 3A depicts a rear view of a disclosed skate tool, showing a blade and screwdriver
FIG. 3B depicts a depicts a side view of a screwdriver that may be integrated into a disclosed embodiment
FIG. 3C depicts a side view of a disclosed blade that may be integrated into a disclosed embodiment

FIG. 3A depicts a back side of a disclosed embodiment 100 comprising a retained "L" shaped screw driver 600 and blade 700. The "L" shaped screw driver 600 may be retained within a void 523 within the main body.

FIG. 3B depicts an "L" shaped screw driver 600 which may comprise a Phillips head 610 and an Allen head 630. The "L" shaped screw driver 600 overcomes shortfalls in the art by providing leverage and compact storage into the body of the tool. Extra useful leverage is obtained by having the Phillips head 610 at the distal end of the longer longitudinal member 607 of the "L" shaped screw driver and by having the Phillips head 630 at the distal end of the shorter longitudinal member 605 of the "L" shaped screw driver. The disclosed "L" shaped screw driver 600 overcomes shortfalls in the art, as extra leverage may be applied to the Allen head 630 by virtue of the longer longitudinal member 607 being disposed at or near a right angle from the Allen head 630.

FIG. 3C depicts blade 700 or other edge implement. A blade may be pivotally connected to a body 500 by use of a pin void 710 or other means of rotation. Blade rotation is shown in FIG. 3D.

FIG. 3D depicts a blade 700 in rotation or hinged attachment to a body 500 of a disclosed tool 100. FIG. 3D also depicts an "L" shaped screw driver 600 being removed from a body 500.

FIG. 3E depicts an alternative "L" shaped screw driver void 570 and blade void 580 with the voids defined within the body 500 and or cover 520. Such voids overcome shortfalls in the art by providing useful tools without increasing the form factor of the invention. An "L" shaped screw driver may be retained in a first void 523 as shown in FIG. 3A or in an alternative void 570, as shown in FIG. 3E. FIG. 3E further depicts a blade void 580 defined within the tool.

Figures 4, 5:
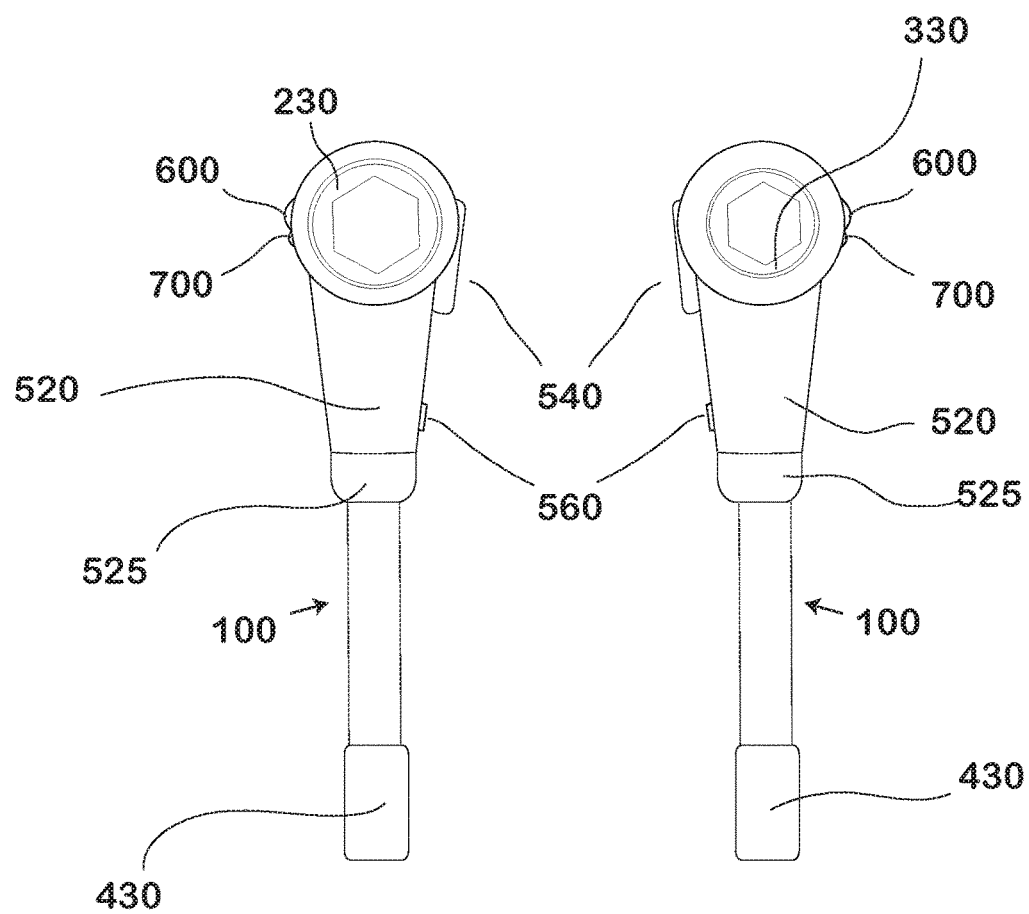
FIG. 4 depicts a side view of a disclosed embodiment
FIG. 5 depicts a side view of a disclosed embodiment

FIG. 4 depicts a socket 230 of the first arm 200 and related components. FIG. 4 depicts an embodiment 100 comprising an "L" shaped screw driver 600, a blade 700, a cover 520 and endcap 525. The endcap 525 overcomes shortfalls in the art by providing a two piece (when used with the main cover 520) transition from a main body large circumference to a smaller circumference to comport with the diameter of the third arm 400.

FIG. 5 depicts a socket 330 of the second arm 300 and related components.

Figure 6:
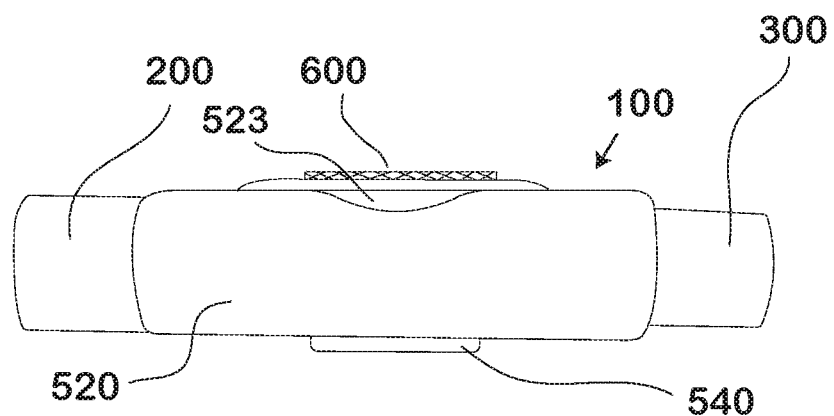
FIG. 6 depicts a top view of a disclosed embodiment

FIG. 6 depicts a top view of a disclosed embodiment that may include a cover 520 upon or around the body. FIG. 6 further depicts a re-threading tool 540, the top part of void 523 to accept an "L" shaped screw driver. FIG. 6 further depicts a first arm 200 and a second arm 300.

Figure 7:
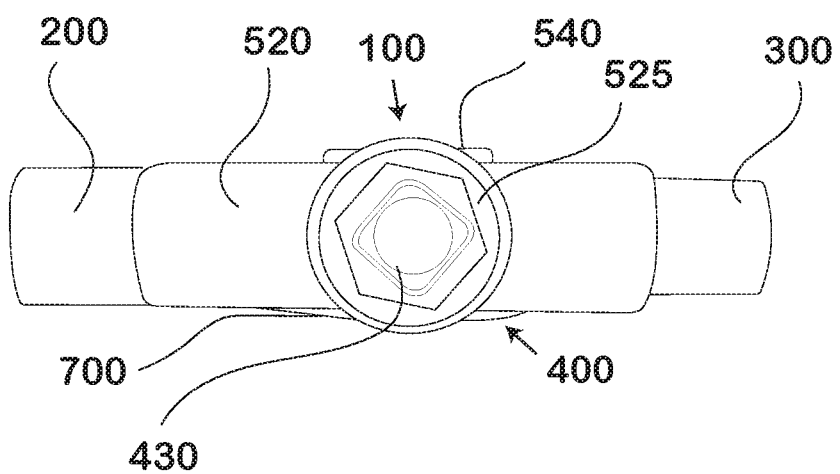
FIG. 7 depicts an end view of a disclosed embodiment

FIG. 7 depicts an end view showing the details of a third arm 400 which may include a socket 430 or similar implement.

Disclosed embodiments may include the following items.

Item 1. A skateboard tool, the tool of a "T" shape, the tool comprising a body and three arms, with each arm comprising a socket or other work piece, the body attached to or comprising a re-threading tool, the body containing an "L" shaped screw driver and a blade, the "L" shape screw driver comprising an Allen head and a Philips head and the blade in rotational attachment to the body.

Item 2. The tool of item 1 wherein the sockets or other work pieces are of different sizes from each other.

Item 3. The tool of item 1 wherein a first socket is a {fraction (9/16)} inch socket, a second socket is a ½ inch socket, and a third socket is a ⅜ inch socket.

Item 4. The tool of item 1 wherein the "L" shaped screw driver comprises a metal file portion (620).

Item 5. The tool of item 1 wherein the body contains a T switch and an internal ratchet mechanism in attachment to the third arm.

What is claimed is:

1. A skate tool (100), of a "T" shape, the tool comprising
   a. a body (500), the body having a front side, a back side, a lower vertical component, a lower end cap, an upper cover, the upper cover having a first end and a second end;
   b. a first arm (200), of a longitudinal shape, the first arm horizontally attached to the body, the first arm having a distal end and a proximal end, the distal end attached to a first socket (230), the proximal end is comported to fit into the first end of the upper cover;
   c. a second arm (300), of a longitudinal shape, the second arm horizontally attached to the body, the second arm having a distal end and a proximal end, the distal end attached to a second socket (330), the proximal end is comported to fit into the second end of the upper cover;
   d. a re-threading tool (540), the re-threading tool attached to the front side of the body above the lower vertical component of the body;
   e. the lower vertical component comprising a ratchet selector switch, the ratchet selector switch configured below the re-threading tool controls rotational force of a third arm (400), of a longitudinal shape, the third arm vertically attached to the body, the third arm having a distal end and a proximal end, the distal end attached to an end socket (430), the proximal end attached to the lower vertical component; and
   f. wherein the back side of the body defines an upper void (523) and a lower void (580), the upper void comporting to a screwdriver, of a "L" shape (600), the screw driver contained within the upper void, the lower void configured below the upper void, the lower void comporting to a blade (700), of an externally flat longitudinal shape, the blade defining a pin void (710), the pin void configured to accept a pin, the pin configured to be retained within the body allowing the blade to have a rotational attachment with the body.

2. The skate tool of claim 1 wherein the screw driver comprises:
   a. a longer longitudinal member (607), a shorter longitudinal member (605), a metal file section (620);
   b. the longer longitudinal member having a distal end and a proximal end, the distal end attached to a Philips screw head (610),
   c. shorter longitudinal member having a distal end and a proximal end, the distal end attached to an Allen head (630),
   d. the longer longitudinal member attached at a right or near right angle to the proximal end of the shorter longitudinal member; and
   e. the metal file section is disposed upon the longer longitudinal member.

* * * * *